US012523753B2

(12) United States Patent
Song et al.

(10) Patent No.: US 12,523,753 B2
(45) Date of Patent: Jan. 13, 2026

(54) ULTRASONIC PROBE AND FLEXIBLE PRINTED CIRCUIT BOARD

(71) Applicant: SAMSUNG MEDISON CO., LTD., Gangwon-do (KR)

(72) Inventors: Inseong Song, Daegu (KR); Yoonsung Kyung, Uiwang-si (KR); Wonsoon Hwang, Hanam-si (KR)

(73) Assignee: SAMSUNG MEDISON CO., LTD., Gangwon-Do (KR)

( * ) Notice: Subject to any disclaimer, the term of this patent is extended or adjusted under 35 U.S.C. 154(b) by 120 days.

(21) Appl. No.: 18/424,656

(22) Filed: Jan. 26, 2024

(65) Prior Publication Data

US 2025/0123381 A1    Apr. 17, 2025

(30) Foreign Application Priority Data

Oct. 12, 2023   (KR) .......................... 10-2023-0136056

(51) Int. Cl.
*G01S 7/52*      (2006.01)
*G10K 11/35*   (2006.01)

(52) U.S. Cl.
CPC ...... *G01S 7/52082* (2013.01); *G01S 7/52084* (2013.01); *G10K 11/355* (2013.01)

(58) Field of Classification Search
CPC ............ G01S 7/52082; G01S 7/52084; G10K 11/355; A61B 8/4488; A61B 8/4405;
(Continued)

(56) References Cited

U.S. PATENT DOCUMENTS 5,044,053 A    9/1991   Kopel
8,971,151 B2   3/2015   Kubota et al.
(Continued)

FOREIGN PATENT DOCUMENTS

EP    4537764 A1 *  4/2025   ............. H05K 1/147
JP    H06-29072 A   2/1994
(Continued)

OTHER PUBLICATIONS

The Extended European Search Report dated Jul. 9, 2024 issued in European Patent Application No. 24153591.3.
(Continued)

*Primary Examiner* — Daniel Pihulic
(74) *Attorney, Agent, or Firm* — Morgan Lewis & Bockius LLP

(57) ABSTRACT

Disclosed is an ultrasonic probe including a transducer array connected to a rotation shaft, a motor provided to rotate the transducer array around the rotation shaft, a printed circuit board provided to output a driving signal for driving the transducer array, and a flexible printed circuit board electrically connected to the printed circuit board to transmit the driving signal to the transducer array, wherein the flexible printed circuit board includes an array terminal electrically connected to the transducer array, a first terminal electrically connected to one portion of the printed circuit board, a first connection part connecting the array terminal and the first terminal, a second terminal electrically connected to the other portion of the printed circuit board, and a second connection part connecting the array terminal and the second terminal, and wherein the first connection part and the second connection part are overlapped with each other and wound around the rotation shaft.

14 Claims, 14 Drawing Sheets

(58) Field of Classification Search
CPC ... A61B 8/4427; A61B 8/4472; A61B 8/4466; A61B 8/56; A61B 8/4444; A61B 2562/166; H05K 1/147
See application file for complete search history.

(56) References Cited

U.S. PATENT DOCUMENTS

| | | |
|---|---|---|
| 9,953,625 B2 | 4/2018 | Kandori |
| 10,238,364 B2 | 3/2019 | Deladi et al. |
| 2003/0153834 A1 | 8/2003 | Miller |
| 2005/0154312 A1 | 7/2005 | Bruestle |
| 2013/0172751 A1 | 7/2013 | Heinrich et al. |
| 2013/0172756 A1* | 7/2013 | Bruestle ............... A61B 8/4483 600/459 |
| 2022/0125408 A1 | 4/2022 | Ferin et al. |
| 2025/0123381 A1* | 4/2025 | Song .................. G01S 7/52084 |

FOREIGN PATENT DOCUMENTS

| | | | | |
|---|---|---|---|---|
| JP | 2008-187625 A | | 8/2008 | |
| KR | 10-2015-0007244 A | | 1/2015 | |
| KR | 20250052813 A | * | 4/2025 | ............. H05K 1/147 |
| WO | 2012/160501 A3 | | 11/2012 | |
| WO | WO-2012160501 A2 | * | 11/2012 | ........... G01S 15/894 |
| WO | 2019/212068 A1 | | 11/2019 | |

OTHER PUBLICATIONS

Communication under Rule 71(3) EPC dated Jul. 10, 2025 issued in European Patent Application. No. 21845191.2.

* cited by examiner (a)

(b)

230

(a)                      (b)

(a)                (b)

ULTRASONIC PROBE AND FLEXIBLE PRINTED CIRCUIT BOARD

CROSS-REFERENCE TO RELATED APPLICATION(S)

This application is based on and claims priority under 35 U.S.C. § 119 to Korean Patent Application No. 10-2023-0136056, filed on Oct. 12, 2023, in the Korean Intellectual Property Office, the disclosure of which is incorporated by reference herein in its entirety.

BACKGROUND

1. Field

The disclosure relates to an ultrasonic probe having an improved structure and a flexible printed circuit board included in the ultrasonic probe.

2. Description of the Related Art

Recently, in a medical field, various medical imaging devices have been widely used to image and obtain information about biological tissues of a human body for the purpose of early diagnosis of various diseases or surgery. Representative examples of such medical imaging devices may include ultrasonic imaging devices, CT devices, and MRI devices.

An ultrasonic imaging device is a device that radiates an ultrasonic signal generated from a transducer of a probe to an object, and non-invasively obtains at least one image of a region inside the object (e.g., soft tissue or blood flow) by receiving information from the signal reflected from the object. In particular, the ultrasonic imaging device is used for medical purposes such as observing the interior of an object, detecting foreign substances, and measuring injury. Such an ultrasonic imaging device is widely used along with other imaging devices because the ultrasonic imaging device has higher stability than an imaging device using an X-ray, may display images in real time, and does not cause radiation exposure.

An ultrasonic probe may include a volume probe that obtains a 3D image by rotating a transducer array at a certain angle. A signal connector made of flexible material is used to withstand a load caused when the transducer array rotates, but as the number of channels of the ultrasonic probe increases, an area of the signal connector increases, thereby increasing the need for space utilization.

SUMMARY

It is an aspect of the disclosure to provide an ultrasonic probe and a flexible printed circuit board (FPCB) capable of reducing a space occupied by a signal connector by folding and overlapping the flexible printed circuit board as the signal connector.

It is an aspect of the disclosure to provide an ultrasonic probe and a flexible printed circuit board capable of better withstanding a load caused by rotation of a transducer array by overlapping the flexible printed circuit board and winding the overlapped flexible printed circuit board around a rotation shaft.

Additional aspects of the disclosure will be set forth in part in the description which follows and, in part, will be obvious from the description, or may be learned by practice of the disclosure.

In accordance with an aspect of the disclosure, an ultrasonic probe includes a transducer array connected to a rotation shaft, a motor provided to rotate the transducer array around the rotation shaft, a printed circuit board provided to output a driving signal for driving the transducer array, and a flexible printed circuit board electrically connected to the printed circuit board to transmit the driving signal to the transducer array, wherein the flexible printed circuit board includes an array terminal electrically connected to the transducer array, a first terminal electrically connected to one portion of the printed circuit board, a first connection part connecting the array terminal and the first terminal, a second terminal electrically connected to the other portion of the printed circuit board, and a second connection part connecting the array terminal and the second terminal, and wherein the first connection part and the second connection part are overlapped with each other and wound around the rotation shaft.

The first connection part may be folded twice or more and overlapped with the second connection part.

The first connection part may be formed to be longer than the second connection part.

The first connection part and the second connection part may be completely overlapped with each other.

A portion where the first connection part and the second connection part are overlapped with each other may be wound around the rotation shaft.

A radius at which the flexible printed circuit board is wound around the rotation shaft may be smaller than a rotation radius of the transducer array.

A length of the transducer array in a lateral direction may be longer than a width of the overlapped first connection part and second connection part.

In accordance with another aspect of the disclosure, a flexible printed circuit board, which is configured to transmit a driving signal from a printed circuit board to a transducer array connected to a rotation shaft, includes an array terminal electrically connected to the transducer array, a first terminal electrically connected to one portion of the printed circuit board, a first connection part connecting the array terminal and the first terminal, a second terminal electrically connected to the other portion of the printed circuit board, and a second connection part connecting the array terminal and the second terminal, wherein the first connection part and the second connection part are overlapped with each other and wound around the rotation shaft.

The first connection part may be folded twice or more and overlapped with the second connection part.

The first connection part may be formed to be longer than the second connection part.

The first connection part and the second connection part may be completely overlapped with each other.

A portion where the first connection part and the second connection part are overlapped with each other may be wound around the rotation shaft.

A radius at which the flexible printed circuit board is wound around the rotation shaft may be smaller than a rotation radius of the transducer array.

A length of the transducer array in a lateral direction may be longer than a width of the overlapped first connection part and second connection part.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
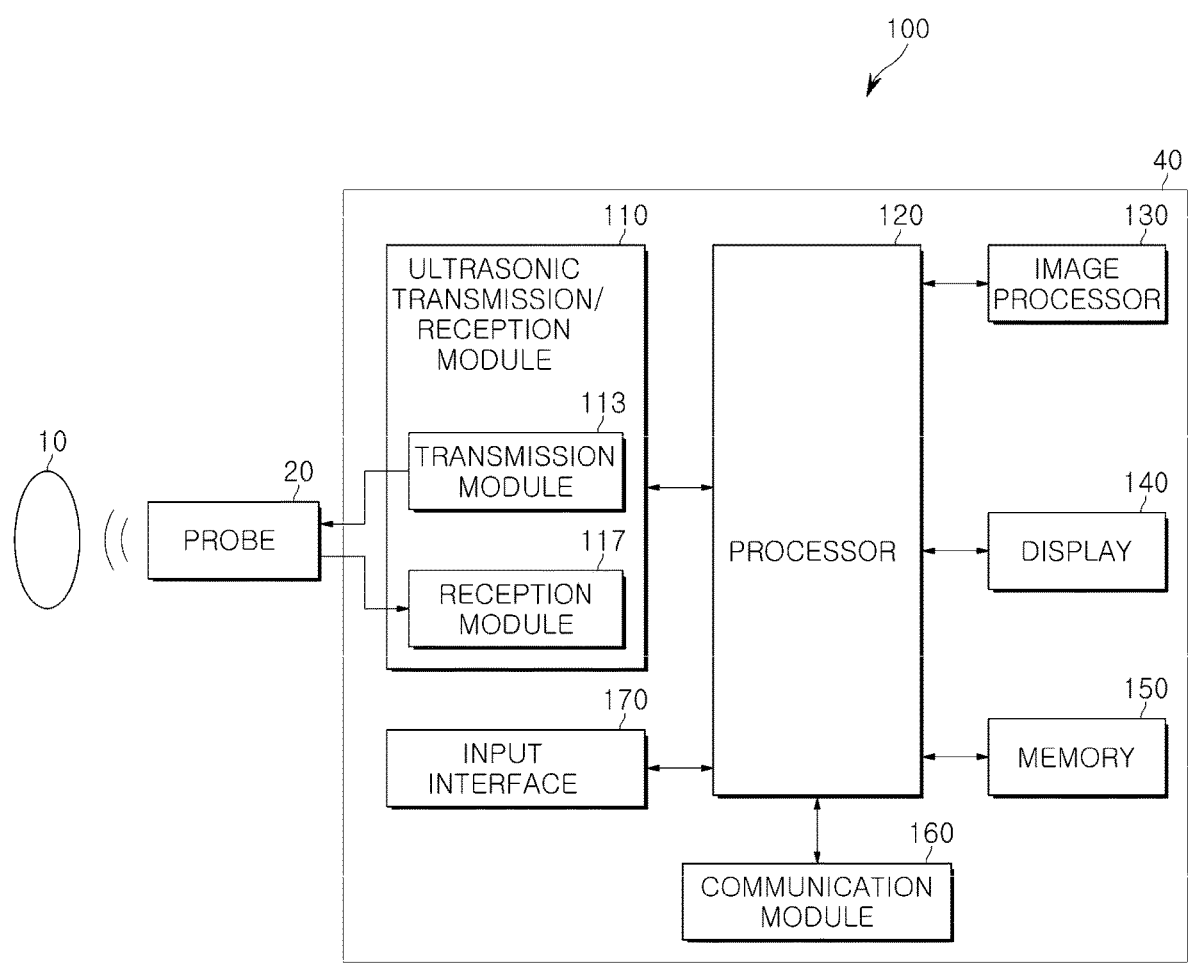
FIGS. 1A and 1B are block diagrams illustrating a configuration of an ultrasonic imaging system according to an embodiment.

This disclosure will explain the principles and disclose embodiments of the disclosure to clarify the scope of the claims of the disclosure and enable those skilled in the art to which the embodiments of the disclosure belong to practice the embodiments. The embodiments of the disclosure may be implemented in various forms.

Like reference numbers refer to like elements throughout this specification. This specification does not describe all components of the embodiments, and general contents in the technical field to which the disclosure belongs or overlapping contents between the embodiments will not be described. The "module" or "unit" used in the specification may be implemented as one or a combination of two or more of software, hardware, or firmware, and according to embodiments, a plurality of "module" or "unit" may be implemented as a single element, or a single "module" or "unit" may include a plurality of elements.

The singular form of a noun corresponding to an item may include a single item or a plurality of items, unless the relevant context clearly indicates otherwise.

In this disclosure, each of phrases such as "A or B," "at least one of A and B," "at least one of A or B," "A, B or C," "at least one of A, B and C," and "at least one of A, B, or C" may include any one of the items listed together in the corresponding one of the phrases, or all possible combinations thereof.

The term "and/or" includes any combination of a plurality of related components or any one of a plurality of related components.

The terms such as "first," "second," "primary," and "secondary" may simply be used to distinguish a given component from other corresponding components, and do not limit the corresponding components in any other respect (e.g., importance or order).

The terms "front surface," "rear surface," "upper surface," "lower surface," "side surface," "left side," "right side," "upper portion," "lower portion," and the like used in the disclosure are defined with reference to the drawings, and the shape and position of each component are not limited by these terms.

The terms "comprises," "has," and the like are intended to indicate that there are features, numbers, steps, operations, components, parts, or combinations thereof described in the disclosure, and do not exclude the presence or addition of one or more other features, numbers, steps, operations, components, parts, or combinations thereof.

When any component is referred to as being "connected," "coupled," "supported," or "in contact" with another component, this includes a case in which the components are indirectly connected, coupled, supported, or in contact with each other through a third component as well as directly connected, coupled, supported, or in contact with each other.

When any component is referred to as being located "on" or "over" another component, this includes not only a case in which any component is in contact with another component but also a case in which another component is present between the two components.

Hereinafter, an ultrasonic device according to various embodiments will be described in detail with reference to the accompanying drawings. When described with reference to the attached drawings, similar reference numbers may be assigned to identical or corresponding components and redundant description thereof may be omitted.

In the disclosure, images may include a medical image obtained by a medical imaging device, such as a magnetic resonance imaging (MRI) device, a computed tomography (CT) device, an ultrasonic imaging device, and an x-ray imaging device.

In the disclosure, an 'object', which is subject to photography, may include a person, animal, or part thereof. For example, the object may include a part of a human body (organ, etc.) or a phantom.

Throughout the disclosure, an 'ultrasonic image' refers to an image of an object that has been processed based on an ultrasonic signal transmitted to and reflected from the object.

Hereinafter, embodiments will be described in detail with reference to the drawings.

Figure 1B:
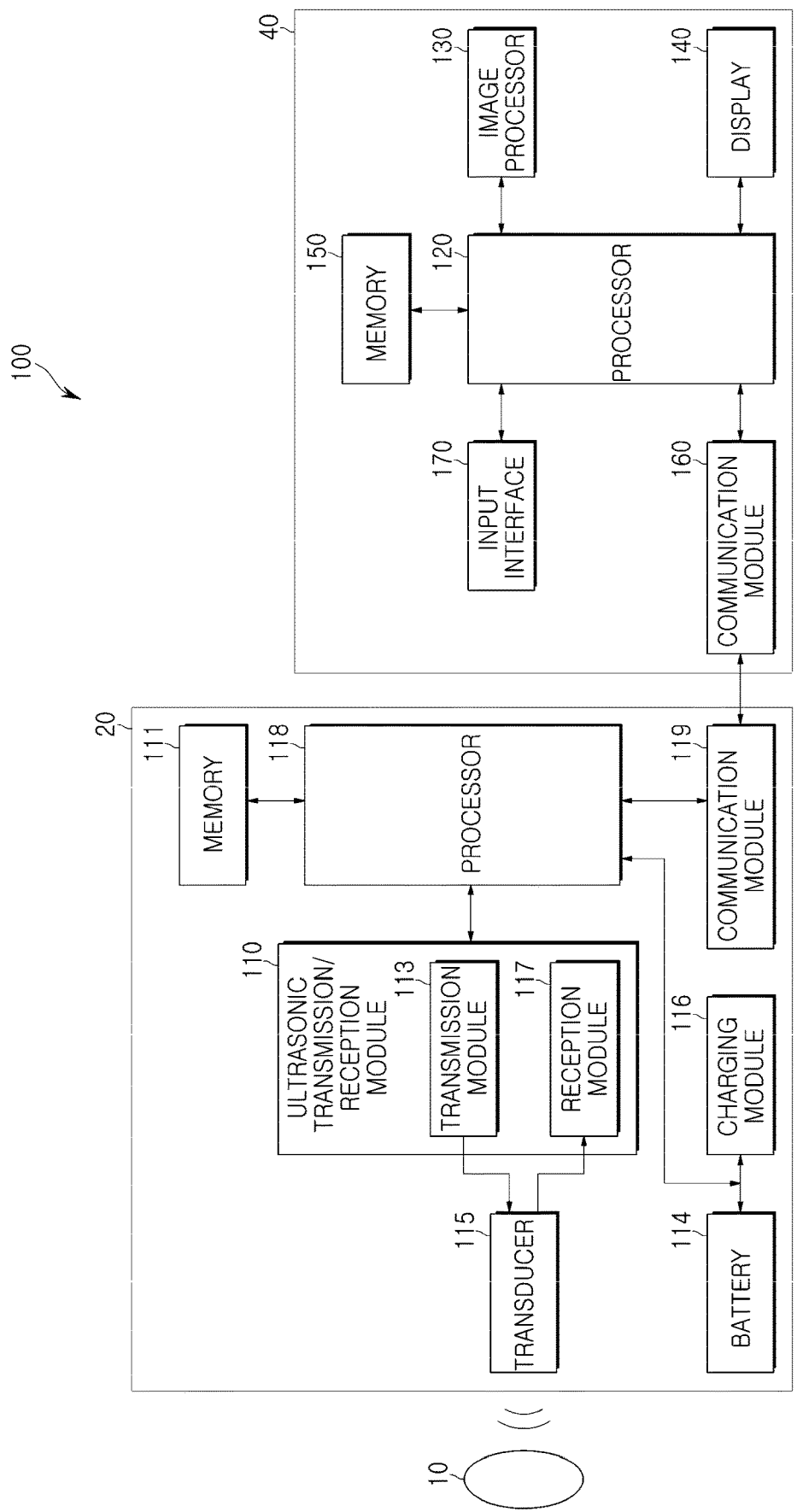

FIGS. 1A and 1B are block diagrams illustrating a configuration of an ultrasonic imaging system according to an embodiment.

Referring to FIGS. 1A and 1B, an ultrasonic imaging system 100 may include a probe 20 and an ultrasonic imaging device 40.

The ultrasonic imaging device 40 may be implemented not only in a cart type but also in a portable form. The portable ultrasonic imaging device may include, for example, a smart phone, laptop computer, PDA, tablet PC, etc., which include a probe and an application, but is not limited thereto.

The probe 20 may include a wired probe connected to the ultrasonic imaging device 40 by wire to communicate with the ultrasonic imaging device 40 by wire, a wireless probe wirelessly connected to the ultrasonic imaging device 40 to communicate wirelessly with the ultrasonic imaging device 40, and/or a hybrid probe by wire or wirelessly connected to the ultrasonic imaging device 40 to communicate by wire or wirelessly with the ultrasonic imaging device 40.

According to various embodiments, as illustrated in FIG. 1A, the ultrasonic imaging device 40 may include an ultrasonic transmission/reception module 110, or as illustrated in 1B, the probe 20 may include the ultrasonic transmission/reception module 110. According to various embodiments, both the ultrasonic imaging device 40 and the probe 20 may also include the ultrasonic transmission/reception module 110.

According to various embodiments, the probe 20 may further include an image processor 130, a display 140, and/or an input interface 170.

Accordingly, the description of the ultrasonic transmission/reception module 110, the image processor 130, the display 140, and/or the input interface 170 included in the ultrasonic imaging device 40 may also be applied to the ultrasonic transmission/reception module 110, the image processor 130, the display 140, and/or the input interface 170 included in the probe 20.

FIG. 1A illustrates a control block diagram of the ultrasonic imaging system 100 in a case in which the probe 20 is a wired probe or a hybrid probe.

The probe 20 may include a plurality of transducers. The plurality of transducers may transmit an ultrasonic signal to an object 10 in response to a transmission signal applied from a transmission module 113. The plurality of transducers may form a received signal by receiving the ultrasonic signal (echo signal) reflected from the object 10. The probe 20 may also be implemented integrally with the ultrasonic imaging device 40, or may be implemented as a separate type connected to the ultrasonic imaging device 40 by wire. The ultrasonic imaging device 40 may be connected to the one or more probes 20 depending on the implementation type.

In the case in which the probe 20 is a wired probe or a hybrid probe, the probe 20 may include a cable and a connector capable of being connected to a connector of the ultrasonic imaging device 40.

The probe 20 according to an embodiment may be implemented as a two-dimensional probe. In a case in which the probe 20 is implemented as a two-dimensional probe, the plurality of transducers included in the probe 20 may be arranged in two dimensions to form a two-dimensional transducer array.

For example, the two-dimensional transducer array may have a form in which a plurality of sub-arrays including the plurality of transducers arranged in a first direction is arranged in a second direction different from the first direction.

In addition, the case in which the probe 20 is implemented as a two-dimensional probe, the ultrasonic transmission/reception module 110 may include an analog beamformer and a digital beamformer. Alternatively, the two-dimensional probe may include one or both of the analog beamformer and the digital beamformer depending on the implementation type.

A processor 120 controls the transmission module 113 to form a transmission signal to be applied to each of a transducers 115 in consideration of positions and focal points of the plurality of transducers included in the probe 20.

The processor 120 may control a reception module 117 to generate ultrasonic data by converting reception signals received from the probe 20 to analog to digital and summing the digitally converted reception signals in consideration of the positions and focal points of the plurality of transducers.

In the case in which the probe 20 is implemented as a two-dimensional probe, the processor 120 may calculate a time delay value for digital beamforming for each sub-array for each of the plurality of sub-arrays included in the two-dimensional transducer array. The processor 120 may also calculate a time delay value for analog beamforming for each of the transducers included in one of the plurality of sub-arrays. The processor 120 may control the analog beamformer and the digital beamformer to form a transmission signal to be applied to each of the plurality of transducers depending on the time delay values for analog beamforming and the time delay values for digital beamforming. The processor 120 may also control the analog beamformer to sum up the signals received from the plurality of transducers for each sub-array depending on the time delay values for analog beamforming. The processor 120 may also control the ultrasonic transmission/reception module 110 to convert the summed signal for each sub-array to analog to digital. The processor 120 may also control the digital beamformer to generate ultrasonic data by summing the digitally converted signals depending on the time delay values for digital beamforming.

The image processor 130 generates an ultrasonic image using the generated ultrasonic data.

The display 140 may display the generated ultrasonic image and a variety of information processed by the ultrasonic imaging device 40 and/or the probe 20. The probe 20 and/or the ultrasonic imaging device 40 may include the one or more displays 140 depending on the implementation type. The display 140 may include a touch panel or a touch screen.

The processor 120 may control the overall operation of the ultrasonic imaging device 40 and signal flow between internal components of the ultrasonic imaging device 40. The processor 120 may perform or control various operations or functions of the ultrasonic imaging device 40 by executing programs or instructions stored in a memory 150. The processor 120 may also control an operation of the ultrasonic imaging device 40 by receiving a control signal from the input interface 170 or an external device.

The ultrasonic imaging device 40 may include a communication module 160, and may be connected to an external device (e.g., the probe 20, a server, medical device, portable device (a smart phone, tablet PC, wearable device, etc.)) through the communication module 160.

The communication module 160 may include one or more components that enable communication with the external device, and may include, for example, at least one of a short-range communication module, a wired communication module, and a wireless communication module.

The communication module 160 may receive a control signal and data from the external device, and may transmit the received control signal to the processor 120 to enable the processor 120 to control the ultrasonic imaging device 40 depending on the received control signal.

Alternatively, the processor 120 may transmit a control signal to the external device through the communication module 160 to control the external device depending on the control signal of the processor.

For example, the external device may process data within the external device depending on the control signal of the processor received through the communication module.

A program capable of controlling the ultrasonic imaging device 40 may be installed in the external device, and this program may include instructions for performing some or all of the operations of the processor 120.

The program may be pre-installed on the external device, or a user of the external device may download and install the program from a server providing an application. The server providing the application may include a recording medium in which the program is stored.

The memory 150 may store various data or programs for driving and controlling the ultrasonic imaging device 40, inputted and outputted ultrasonic data, ultrasonic images, etc.

The input interface 170 may receive user input for controlling the ultrasonic imaging device 40. For example, the user input may include, but is not limited to, input of manipulating a button, a keypad, a mouse, a trackball, a jog switch, a knob, and the like, input of touching a touch pad or touch screen, voice input, motion input, biometric information input (e.g., iris recognition, fingerprint recognition, etc.), and the like.

FIG. 1B illustrates a control block diagram of the ultrasonic imaging system 100 in the case in which the probe 20 is a wireless probe or a hybrid probe.

According to various embodiments, the ultrasonic imaging device 40 illustrated in FIG. 1B may be replaced with the ultrasonic imaging device 40 described with reference to FIG. 1A.

According to various embodiments, the probe 20 illustrated in FIG. 1A may be replaced with the probe 20 to be described with reference to FIG. 1B.

The probe 20 may include the transmission module 113, a battery 114, the transducer 115, a charging module 116, the reception module 117, a processor 118, and a communication module 119. Although FIG. 1B illustrates that probe 20 includes both the transmission module 113 and the reception module 117, depending on the implementation type, the probe 20 may include only part of a configuration of the transmission module 113 and the reception module 117, and the part of the configuration of the transmission module 113 and the reception module 117 may be included in the ultrasonic imaging device 40. Alternatively, the probe 20 may further include the image processor 130.

The transducer 115 may include a plurality of transducers. The plurality of transducers may transmit an ultrasonic signal to the object 10 in response to a transmission signal applied from the transmission module 113. The plurality of transducers may receive the ultrasonic signal reflected from the object 10 to form a reception signal.

The charging module 116 may charge the battery 114. The charging module 116 may receive power from the outside. The charging module 116 may receive power wirelessly. However, the disclosure is not limited thereto, and the charging module 116 may receive power by wire. The charging module 116 may transfer the received power to the battery 114.

The processor 118 controls the transmission module 113 to form a transmission signal to be applied to each of the plurality of transducers in consideration of the positions and focal points of the plurality of transducers.

The processor 118 controls the reception module 117 to generate ultrasonic data by converting reception signals received from the transducer 115 to analog to digital and summing the digitally converted reception signals in consideration of the positions and focal points of the plurality of transducers. Alternatively, in a case in which the probe 20 includes the image processor 130, the probe 20 may generate an ultrasonic image using the generated ultrasonic data.

In the case in which the probe 20 is implemented as a two-dimensional probe, the processor 118 may calculate a time delay value for digital beamforming for each sub-array for each of the plurality of sub-arrays included in the two-dimensional transducer array. The processor 118 may also calculate a time delay value for analog beamforming for each of the transducers included in one of the plurality of sub-arrays. The processor 118 may control the analog beamformer and the digital beamformer to form a transmission signal to be applied to each of the plurality of transducers depending on the time delay values for analog beamforming and the time delay values for digital beamforming. The processor 118 may also control the analog beamformer to sum up the signals received from the plurality of transducers for each sub-array depending on the time delay values for analog beamforming. The processor 118 may also control the ultrasonic transmission/reception module 110 to convert the summed signal for each sub-array to analog to digital. The processor 118 may also control the digital beamformer to generate ultrasonic data by summing the digitally converted signals depending on the time delay values for digital beamforming.

The processor 118 may control the overall operation of the probe 20 and the signal flow between the internal components of the probe 20. The processor 118 may perform or control the various operations or functions of the probe 20 by executing programs or instructions stored in a memory 111. The processor 118 may also control the operation of the probe 20 by receiving the control signal from the input interface 170 of the probe 20 or an external device (e.g., the ultrasonic imaging device 40).

The communication module 119 may wirelessly transmit the generated ultrasonic data or ultrasonic images to the ultrasonic imaging device 40 through a wireless network. The communication module 119 may also receive control signals and data from the ultrasonic imaging device 40.

The ultrasonic imaging device 40 may receive the ultrasonic data or ultrasonic images from the probe 20.

In one embodiment, in a case in which the probe 20 includes the image processor 130 capable of generating an ultrasonic image using ultrasonic data, the probe 20 may transmit ultrasonic data and/or the ultrasonic images generated by the image processor 130 to the ultrasonic imaging device 40.

In one embodiment, in a case in which the probe 20 does not include the image processor 130 capable of generating an ultrasonic image using ultrasonic data, the probe 20 may transmit ultrasonic data to the ultrasonic imaging device 40. The ultrasonic data may include ultrasonic raw data, and the ultrasonic image may refer to ultrasonic image data.

The ultrasonic imaging device 40 may include the processor 120, the image processor 130, the display 140, the memory 150, the communication module 160, and the input interface 170.

The image processor 130 generates an ultrasonic image using ultrasonic data received from the probe 20.

The display 140 may display an ultrasonic image received from the probe 20, an ultrasonic image generated by processing ultrasonic data received from the probe 20, and a variety of information processed by the ultrasonic imaging system 100. The ultrasonic imaging device 40 may include the one or more displays 140 depending on the implementation type. The display 140 may include a touch panel or a touch screen.

The processor 120 may control the overall operation of the ultrasonic imaging device 40 and the signal flow between the internal components of the ultrasonic imaging device 40. The processor 120 may perform or control the various operations or functions of the ultrasonic imaging device 40 by executing the programs or applications stored in a memory 150. The processor 120 may also control the operation of the ultrasonic imaging device 40 by receiving the control signal from the input interface 170 or an external device.

The ultrasonic imaging device 40 may include the communication module 160, and may be connected to an external device (e.g., the probe 20, a server, medical device, portable device (a smart phone, tablet PC, wearable device, etc.)) through the communication module 160.

The communication module 160 may include one or more components that enable communication with the external device, and may include, for example, at least one of a short-range communication module, a wired communication module, and a wireless communication module.

The communication module 160 of the ultrasonic imaging device 40 and the communication module 119 of the probe 20 may communicate using a network or a short-range wireless communication method. For example, the communication module 160 of the ultrasonic imaging device 40 and the communication module 119 of the probe 20 may communicate using any one of wireless LAN, Wi-Fi, Bluetooth, ZigBee, Wi-Fi Direct (WFD), Infrared Data Association (IrDA), Bluetooth Low Energy (BLE), Near Field Communication (NFC), Wireless Broadband Internet (WiBro), World Interoperability for Microwave Access (WiMAX), Shared Wireless Access Protocol (SWAP), Wireless Gigabit Alliance (WiGig), RF communication, a wireless data communication method including 60 GHz millimeter wave (mm wave) short-range communication, etc.

To this end, the communication module 160 of the ultrasonic imaging device 40 and the communication module 119 of the probe 20 may include at least one of a wireless LAN communication module, a Wi-Fi communication module, a Bluetooth communication module, a ZigBee communication module, a Wi-Fi Direct (WFD) communication module, an Infrared Data Association (IrDA) communication module, a Bluetooth Low Energy (BLE) communication module, a Near Field Communication (NFC) module, a Wireless Broadband Internet (WiBro) communication module, a World Interoperability for Microwave Access (WiMAX) communication module, a Shared Wireless Access Protocol (SWAP) communication module, a Wireless Gigabit Alliance (WiGig) communication module, a RF communication module, and a 60 GHz millimeter wave (mm wave) short-range communication module.

In one embodiment, the probe 20 may transmit device information (e.g., ID information) of the probe 20 using a first communication method (e.g., BLE), may be wirelessly paired with the ultrasonic imaging device 40, and may transmit ultrasonic data and/or ultrasonic images to the paired ultrasonic imaging device 40.

The device information of the probe 20 may include a variety of information related to a serial number, model name, and battery state of the probe 20.

The ultrasonic imaging device 40 may receive the device information (e.g., ID information) of the probe 20 from the probe 20 using the first communication method (e.g., BLE), may be wirelessly paired with the probe 20, may transmit an activation signal to the paired probe 20, and may receive the ultrasonic data and/or ultrasonic images from the probe 20. In this case, the activation signal may include a signal for controlling the operation of the probe 20.

In one embodiment, the probe 20 may transmit the device information (e.g., ID information) of the probe 20 using the first communication method (e.g., BLE), may be wirelessly paired with the ultrasonic imaging device 40, and may transmit the ultrasonic data and/or ultrasonic images to the ultrasonic imaging device 40 paired by the first communication method using a second communication method (e.g., 60 GHz millimeter wave and Wi-Fi).

The ultrasonic imaging device 40 may receive the device information (e.g., ID information) of the probe 20 from the probe 20 using the first communication method (e.g., BLE), may be wirelessly paired with the probe 20, may transmit the activation signal to the paired probe 20, and may receive the ultrasonic data and/or ultrasonic images from the probe 20 using the second communication method (e.g., 60 GHz millimeter wave and Wi-Fi).

According to various embodiments, the first communication method used to pair the probe 20 and the ultrasonic imaging device 40 with each other may have a lower frequency band than the frequency band of the second communication method used by the probe 20 to transmit the ultrasonic data and/or ultrasonic images to the ultrasonic imaging device 40.

The display 140 of the ultrasonic imaging device 40 may display UIs indicating device information of the probe 20. For example, the display 140 may display UIs, which indicate identification information of the wireless ultrasonic probe 20, a pairing method indicating a pairing method with the probe 20, a data communication state between the probe 20 and the ultrasonic imaging device 40, a method of performing data communication with the ultrasonic imaging device 40, and the battery state of the probe 20.

In a case in which the probe 20 includes the display 140, the display 140 of the probe 20 may display UIs indicating the device information of the probe 20. For example, the display 140 may display UIs, which indicate the identification information of the wireless ultrasonic probe 20, the pairing method indicating the pairing method with the probe 20, the data communication state between the probe 20 and the ultrasonic imaging device 40, the method of performing data communication with the ultrasonic imaging device 40, and the battery state of the probe 20.

The communication module 160 may receive a control signal and data from an external device and transmit the received control signal to the processor 120 so that the processor 120 controls the ultrasonic imaging device 40 depending on the received control signal.

Alternatively, the processor 120 may transmit a control signal to the external device through the communication module 160 to control the external device depending on the control signal of the processor 120.

For example, the external device may process data of the external device depending on the control signal of the processor 120 received through the communication module 160.

A program capable of controlling the ultrasonic imaging device 40 may be installed in the external device, and this program may include instructions for performing part or all of the operations of the processor 120.

The program may be pre-installed on the external device, or the user of the external device may download and install the program from the server providing the application. The server providing the application may include the recording medium on which the program is stored.

The memory 150 may store various data or programs for driving and controlling the ultrasonic imaging device 40, inputted and outputted ultrasonic data, ultrasonic images, etc.

An example of the ultrasonic imaging system 100 according to an embodiment of the disclosure will be described later through FIGS. 2A, 2B, 2C, and 2D.

FIGS. 2A, 2B, 2C, and 2D are views illustrating ultrasonic imaging devices according to an embodiment.

Figure 2A:
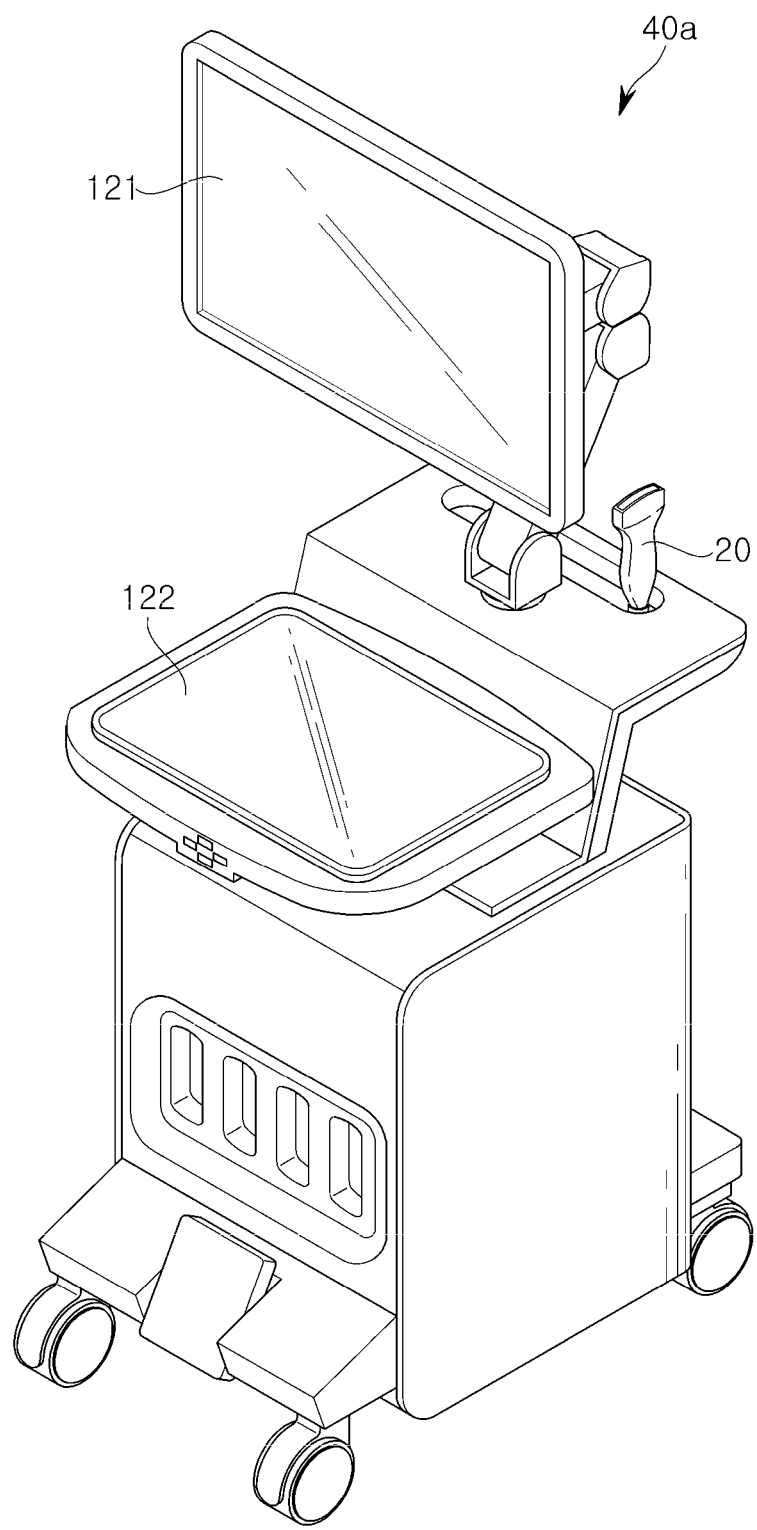
FIGS. 2A, 2B, 2C, and 2D are views illustrating the ultrasonic imaging system according to an embodiment.
Figure 2B:
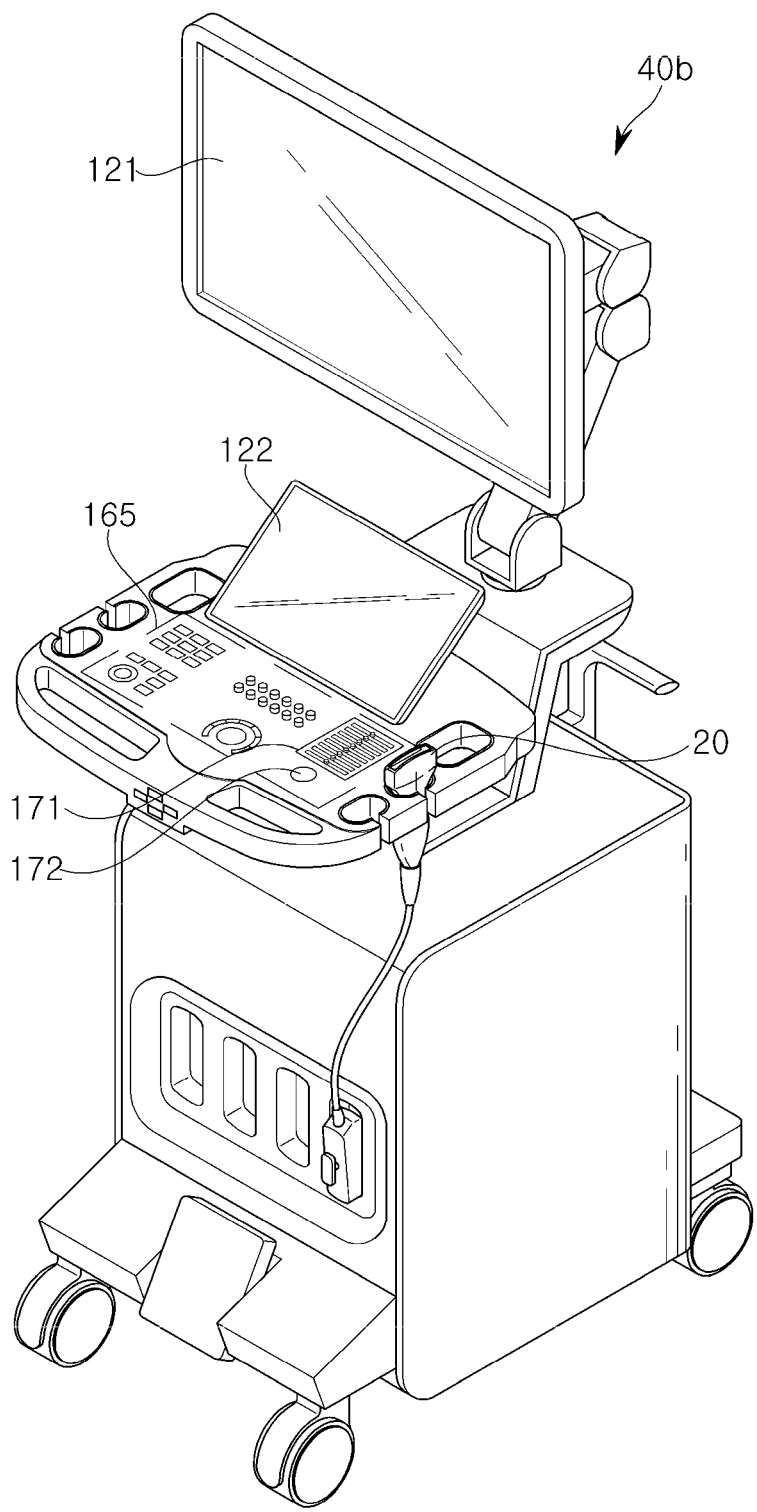

Referring to FIGS. 2A and 2B, ultrasonic imaging devices 40a and 40b may include a main display 121 (140) and a sub display 122 (140). At least one of the main display 121 and the sub display 122 may be implemented as a touch screen. At least one of the main display 121 and the sub display 122 may display ultrasonic images or a variety of information processed by the ultrasonic imaging devices 40a and 40b. In addition, at least one of the main display 121 and the sub display 122 may be implemented as a touch screen and provide a GUI, so that data for controlling the ultrasonic imaging devices 40a and 40b may be input from a user. For example, the main display 121 may display an ultrasonic image, and the sub display 122 may display a control panel for controlling the display of the ultrasonic image in the form of a GUI. The sub display 122 may receive data for controlling the display of images through a control panel displayed in a GUI form. For example, a time gain compensation (TGC) button, a Freeze button, a trackball, a jog switch, a knob, and the like may be provided as a GUI on the sub display 122.

The ultrasonic imaging devices 40a and 40b may control the display of ultrasonic images displayed on the main display 121 using input control data. The ultrasonic imaging devices 40a and 40b may also be connected to the probe 20 by wire or wirelessly to transmit and receive ultrasonic signals to and from the object.

Referring to FIG. 2B, the ultrasonic imaging device 40b may further include a control panel 165 in addition to the main display 121 and the sub display 122. The control panel 165 may include a button, a trackball, a jog switch, a knob, and the like, and may receive data for controlling the ultrasonic imaging device 40b from the user. For example, the control panel 165 may include a time gain compensation (TGC) button 171, a Freeze button 172, and the like. The TGC button 171 is a button for setting a TGC value for each depth of the ultrasonic images. When detecting the input of the Freeze button 172 while scanning an ultrasonic image, the ultrasonic imaging device 40b may maintain the display of the frame image at that point in time.

A button, a trackball, a jog switch, a knob, and the like included in the control panel 165 may be provided as a GUI on the main display 121 or the sub display 122. The ultrasonic imaging devices 40a and 40b may be connected to the probe 20 to transmit and receive ultrasonic signals to and from the object.

Figure 2C:
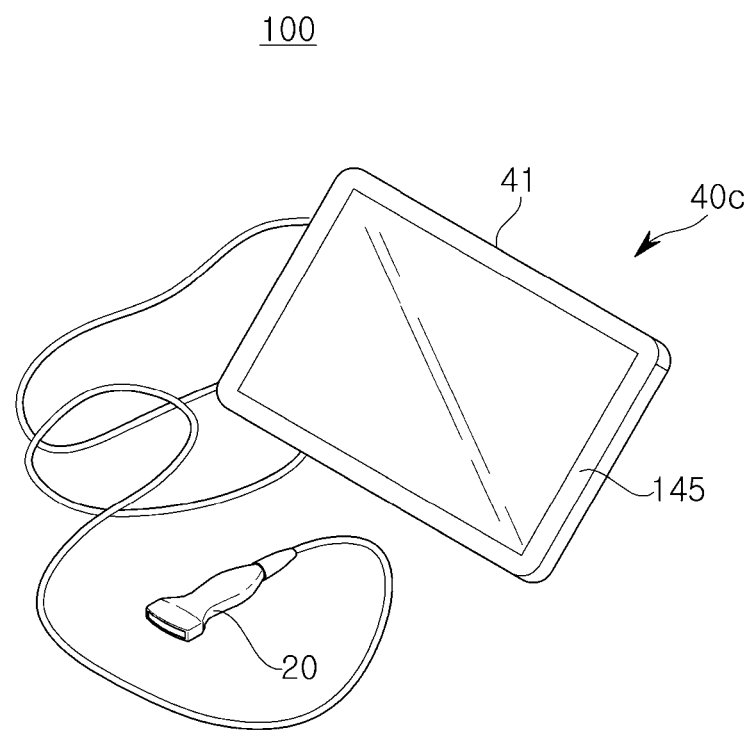
Figure 2D:
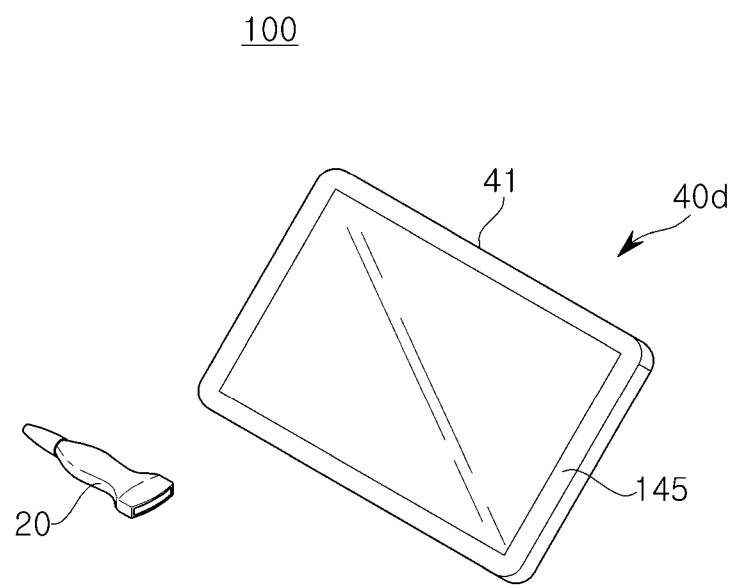

Referring to FIGS. 2C and 2D, the ultrasonic imaging device 40c may also be implemented in a portable form. The portable ultrasonic imaging device 40c may include, for example, a smart phone, laptop computer, PDA, tablet PC, etc., which include a probe and an application, but is not limited thereto.

The ultrasonic imaging device 40c may include a main body 41. Referring to FIG. 2C, the probe 20 may be connected to one side of the main body 41 by wire. To this end, the main body 41 may include a connection terminal through which a cable connected to the probe 20 may be attached and detached, and the probe 20 may include a connection terminal through which a cable connected to the main body 41 may be attached and detached.

Referring to FIG. 2D, the probe 20 may be wirelessly connected to the ultrasonic imaging device 40. The main body 41 may include an input/output interface (e.g., a touch screen) 145 (140 and 170). The input/output interface 145 may display ultrasonic images, a variety of information processed by the ultrasonic imaging devices, a GUI, and the like.

An ultrasonic image may be displayed on the input/output interface 145. The ultrasonic imaging device 40c may correct the ultrasonic image displayed on the input/output interface 145 using AI. The ultrasonic imaging device 40c may provide an alarm informing using various audio-visual tools, such as graphics, sound, and vibration, information about lesions among the ultrasonic images displayed on the input/output interface 145 using AI.

The ultrasonic imaging device 40c may output a control panel displayed in a GUI form through the input/output interface 145.

Hereinafter, a structure of the probe, which obtains three-dimensional images by rotating a transducer array around a rotation shaft, will be described in detail.

Figure 3:
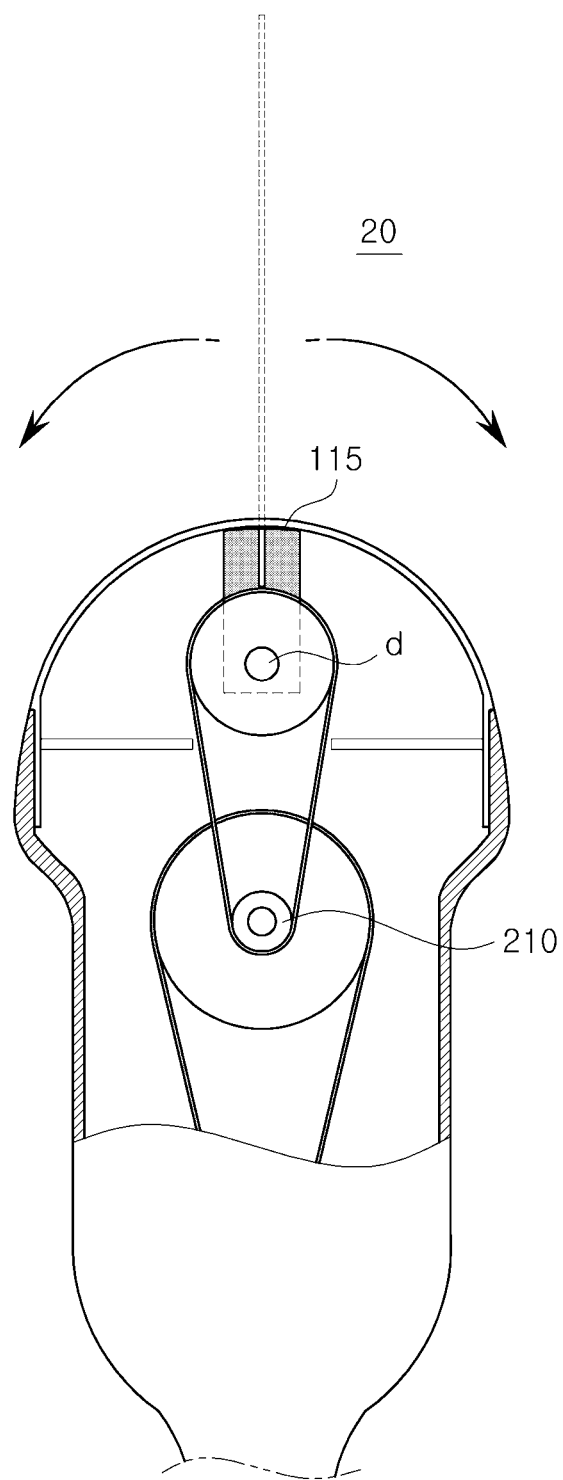
FIG. 3 is a view illustrating rotation of a transducer array of an ultrasonic probe.
Figure 4:
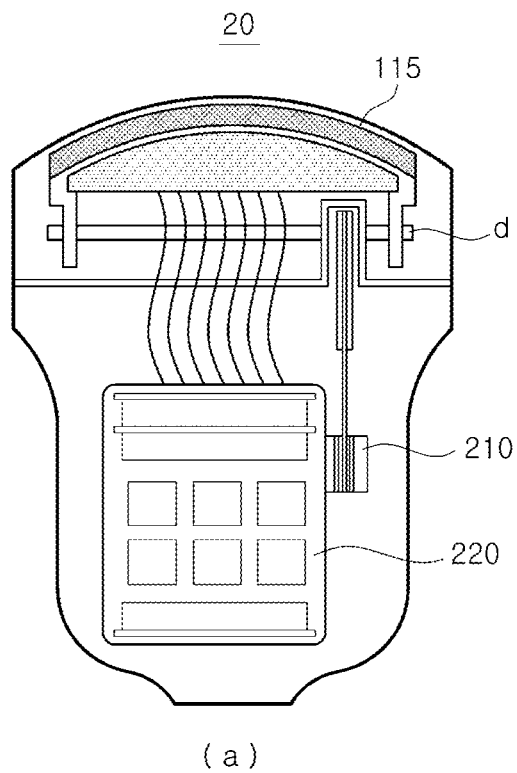
FIGS. 4A and 4B are views illustrating various types of a conventional signal connector.
Figure 4:
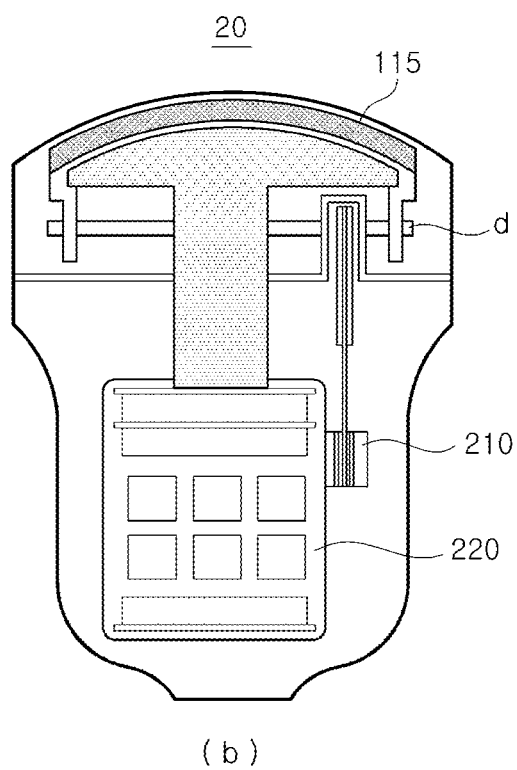
Figure 5:
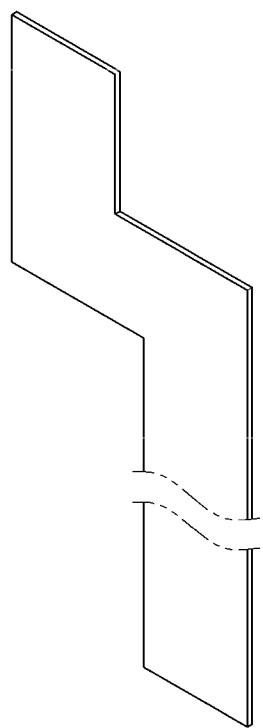
FIGS. 5A and 5B are views illustrating winding of a flexible printed circuit board according to an embodiment.
Figure 5:
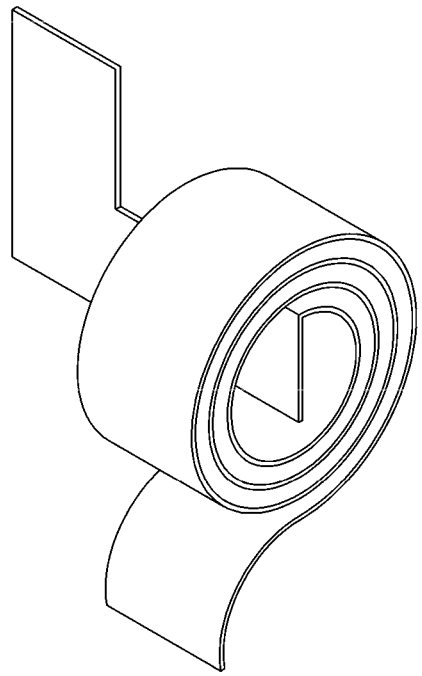

FIG. 3 is a view illustrating rotation of a transducer array of an ultrasonic probe, FIGS. 4A and 4B are views illustrating various types of a conventional signal connector, and FIGS. 5A and 5B, which are views for explaining a space occupied by a flexible printed circuit board as a signal connector, are views illustrating winding of the flexible printed circuit board according to an embodiment.

Referring to FIG. 3, the transducer array 115 may be connected to a rotation shaft d and rotated around the rotation shaft d by a motor 210.

The ultrasonic signal emitted in two dimensions by the transducer array 115 may obtain a three-dimensional ultrasonic image as the transducer array 115 rotates.

In this type of the ultrasonic probe 20, loads are applied to the signal connector as the transducer array 115 rotates, and various types of signal connectors may be used to withstand the loads.

As illustrated in FIG. 4A, a coaxial cable may be used as a signal connector, and as illustrated in FIG. 4B, a flexible printed circuit board (FPCB) 230 may also be used. In addition, the signal connector may be used in various ways.

In the case of using the coaxial cable as a signal connector, the coaxial cable easily distributes the loads so that durability may increase, but manufacturing costs increase so that manufacturing may not be easy. In addition, a space occupied by the coaxial cable may increase due to the increase in signal channels.

In the case of using the FPCB as a signal connector, the manufacturing cost is reduced so that the manufacturing may be easy and a space occupied by the FPCB may be small compared to the coaxial cable, but the durability may be reduced because it is difficult to distribute the loads.

Even though the FPCB occupies less space compared to the coaxial cable, as the number of signal channels continues to increase, the signal channels occupy a lot of space in the ultrasonic probe 20, which may increase the volume of the product.

In the disclosure, a structure of the FPCB is disclosed to solve problems in space utilization that occur when the FPCB is used as a signal connector.

As the flexible printed circuit board 230 having the same shape as in FIG. 5A is wound in the form of a clockwork as illustrated in FIG. 5B, the loads resulting from the rotation of the transducer array 115 may be better distributed, thereby improving durability.

That is, as the flexible printed circuit board 230 wound in the form of a clockwork is repeatedly wound and unwound when the transducer array 115 rotates, the loads applied to the flexible printed circuit board 230 may be distributed.

Hereinafter, a structure of the flexible printed circuit board 230 will be described in detail.

Figure 6:
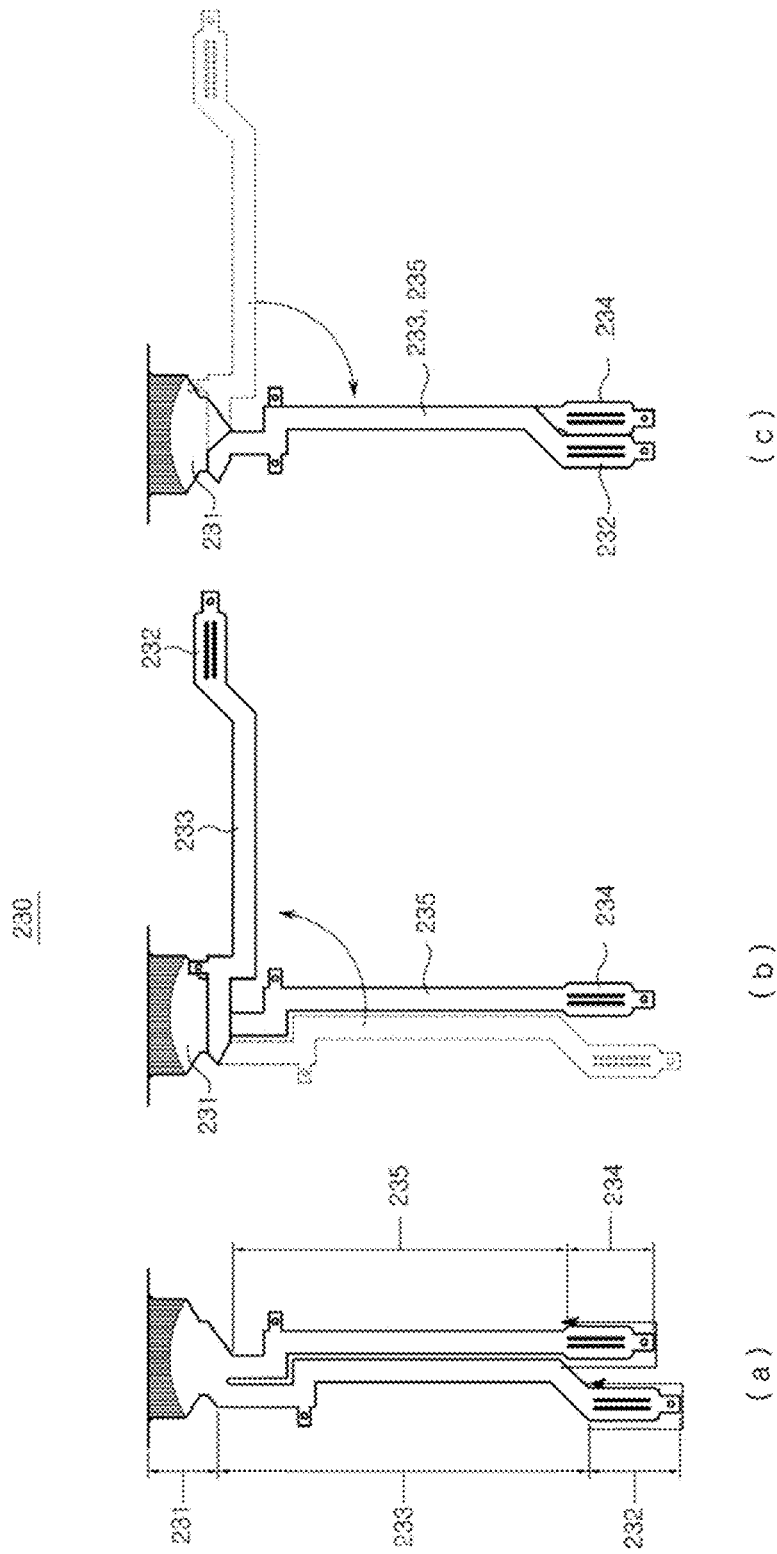
FIGS. 6A to 6C are views for explaining a new structure of the flexible printed circuit board according to an embodiment.
Figure 7:
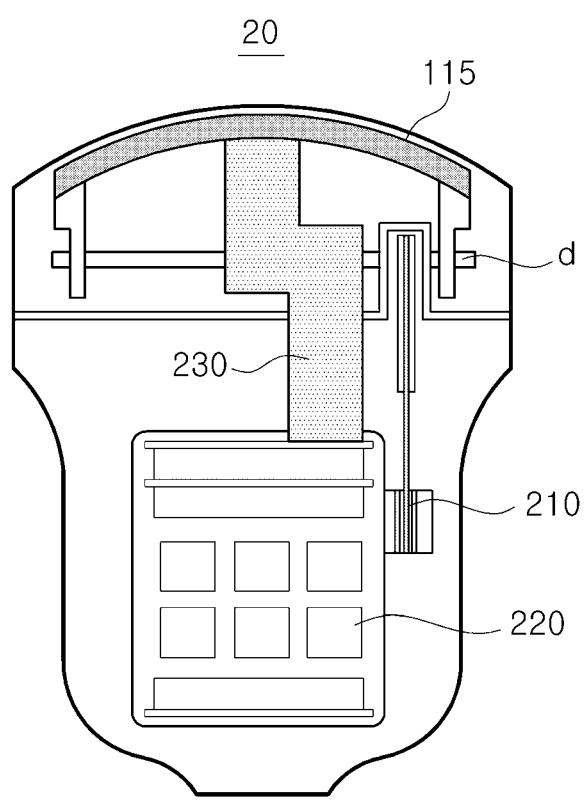
FIG. 7 is a view illustrating the ultrasonic probe into which the flexible printed circuit board is inserted.

FIGS. 6A to 6C are views for explaining a new structure of the flexible printed circuit board according to an embodiment, and FIG. 7 is a view illustrating the ultrasonic probe into which the flexible printed circuit board is inserted.

As illustrated in FIG. 7, the ultrasonic probe 20 may include the transducer array 115 connected to the rotation shaft d, and the motor 210 provided to rotate the transducer around the rotation shaft d.

The ultrasonic probe 20 may also include a printed circuit board 220 provided to output a driving signal for driving the transducer array 115 and the flexible printed circuit board 230 as a signal connector electrically connected to the printed circuit board 220 to transmit the driving signal to the transducer array 115.

The detailed structure of the flexible printed circuit board 230 will be described below with reference to FIG. 6.

The flexible printed circuit board 230 may include an array terminal 231 electrically connected to the transducer array 115, a first terminal 232 electrically connected to one portion of the printed circuit board, a first connection part 233 connecting the array terminal 231 and the first terminal 232, a second terminal 234 electrically connected to the other portion of the printed circuit board, and a second connection part 235 connecting the array terminal 231 and the second terminal 234.

The array terminal 231 may transmit or receive signals to or from the transducer by being electrically connected to the transducer array 115.

The array terminal 231 may be separated into t two or more strands and each connected to the printed circuit board. The disclosure exemplifies two strands, but is not limited thereto, and the array terminal may be separated into two or more strands.

The first terminal 232 may be electrically connected to one portion of the printed circuit board, and the second terminal 234 may be electrically connected to the other portion of the printed circuit board.

The first connection part 233 may connect the first terminal 232 and the array terminal 231, and the second connection part 235 may connect the second terminal 234 and the array terminal 231.

A first strand including the first connection part 233 and the first terminal 232 may be folded at least twice to be overlapped with a second strand including the second connection part 235 and the second terminal 234.

Specifically, in the form illustrated in FIG. 6A, the first strand may be folded once as illustrated in FIG. 6B, and folded once more as illustrated in FIG. 6C to be overlapped with the second strand.

In this case, the first terminal 232 and the second terminal 234 are not overlapped with each other, and the first connection part 233 and the second connection part 235 may be overlapped with each other.

That is, the first connection part 233 may be overlapped with the second connection part 235 by being folded twice.

Although the disclosure has been described as an example in which the first connection part 233 is folded twice as illustrated in FIG. 6, the disclosure is not limited thereto, and the first connection part 233 may be overlapped with the second connection part 235 by being folded twice or more.

In this case, the first connection part 233 and the second connection part 235 may be completely overlapped with each other depending on a structural design.

Because positions of the first terminal 232 and the second terminal 234 do not match as the first connection part 233 is folded and overlapped with the second connection part 235 so that the first terminal 232 and the second terminal 234 may not be electrically connected to the printed circuit board, by forming the first connection part 233, which is a connection part to be folded, longer, when the first connection part 233 is folded and overlapped with the second connection part 235, the first terminal 232 and the second terminal 234 may be positioned on the same line.

In this case, the overlapped portion may be wound around the rotation shaft d, as illustrated in FIG. 5B.

Specifically, a portion where the first connection part 233 and the second connection part 235 are overlapped with each other may be wound around the rotation shaft d.

As the first connection part 233 and the second connection part 235 is overlapped with each other, the space occupied by the flexible printed circuit board 230 in the ultrasonic probe 20 may be reduced, thereby preventing a size of the ultrasonic probe 20 from increasing.

Figure 8:
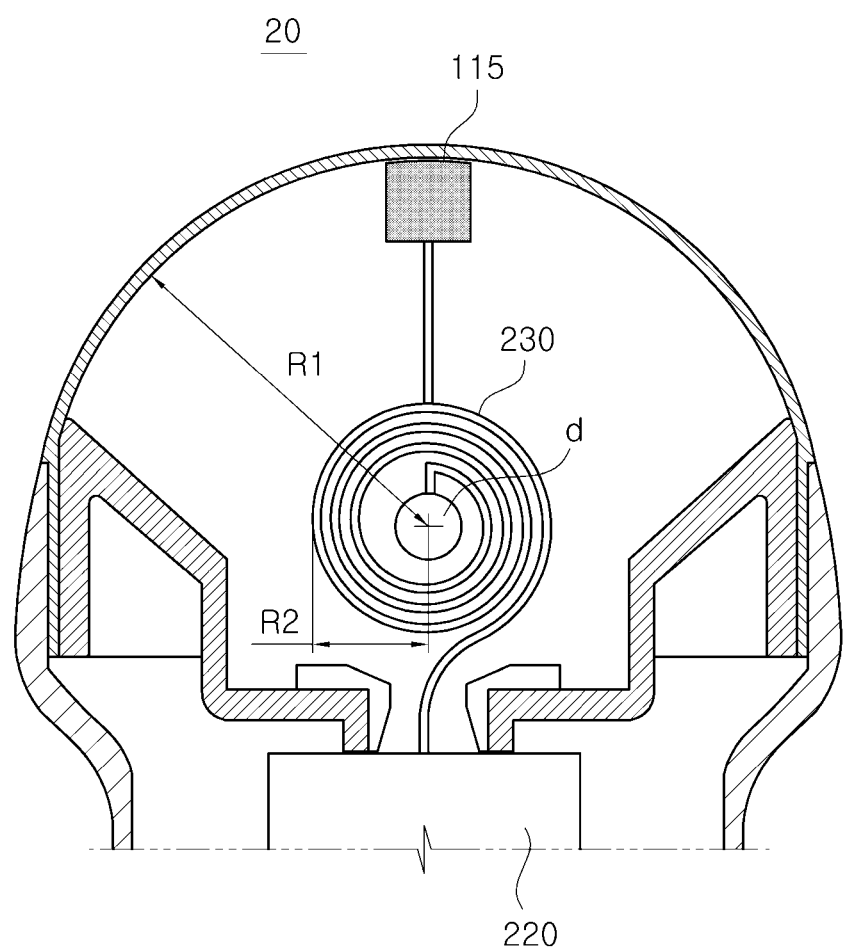
FIG. 8 is a side cross-sectional view of the ultrasonic probe according to an embodiment.
Figure 9:
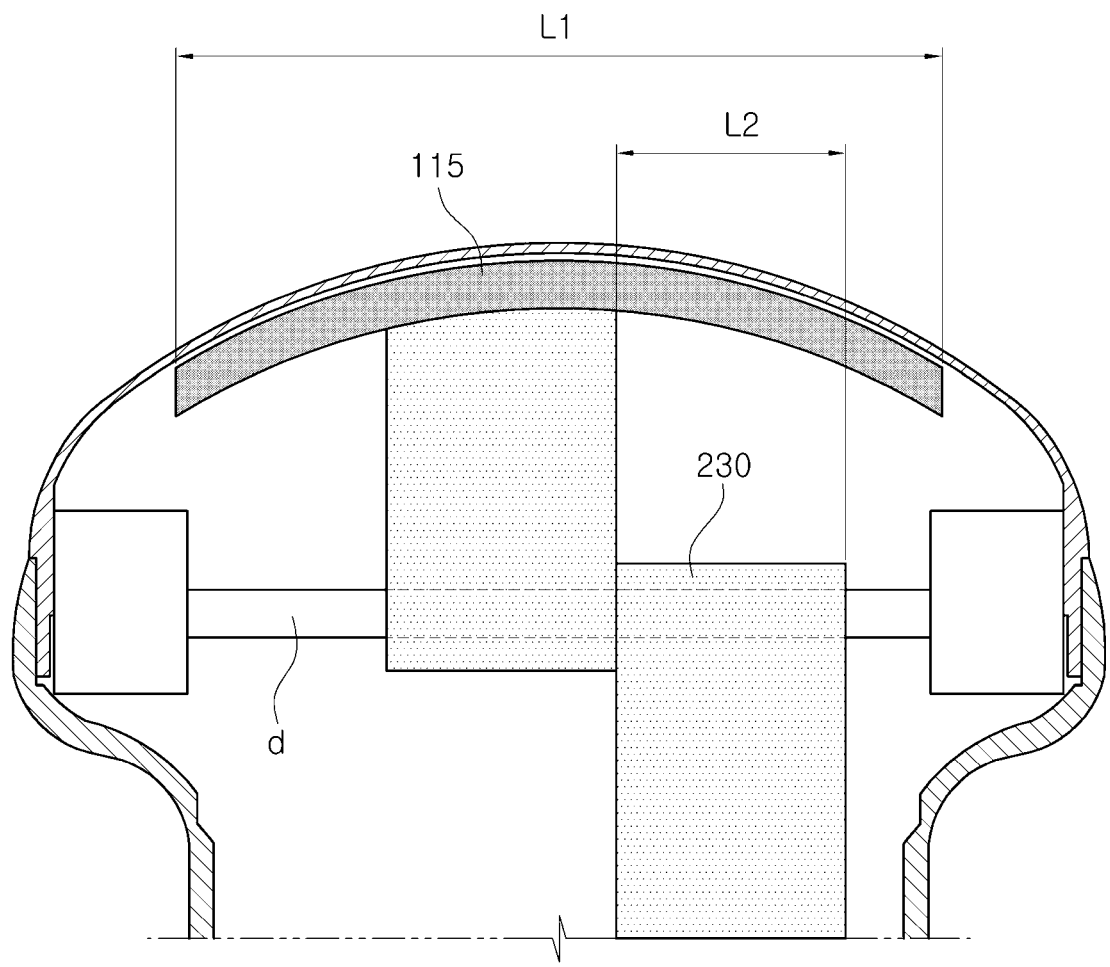
FIG. 9 is a front cross-sectional view of the ultrasonic probe according to an embodiment.

FIG. 8 is a view of the ultrasonic probe according to an embodiment viewed from a side, and FIG. 9 is a view of the ultrasonic probe according to an embodiment viewed from the front.

As described above, the ultrasonic array may is rotated around the rotation shaft d by the motor 210, and the flexible printed circuit board 230 may be wound around the rotation shaft d in the form of a clockwork.

In this case, a rotation radius R1 at which the ultrasonic array rotates may be larger than a radius R2 at which the flexible printed circuit board 230 is wound around the rotation shaft d.

As described above, the first connection part 233 and the second connection part 235 may be overlapped with each other, and a length of the transducer array 115 in an axial (lateral) direction may be longer than a width of the overlapped first connection part 233 and second connection part 235.

Accordingly, the space utilization of the ultrasonic probe 20 may be increased.

Figure 10:
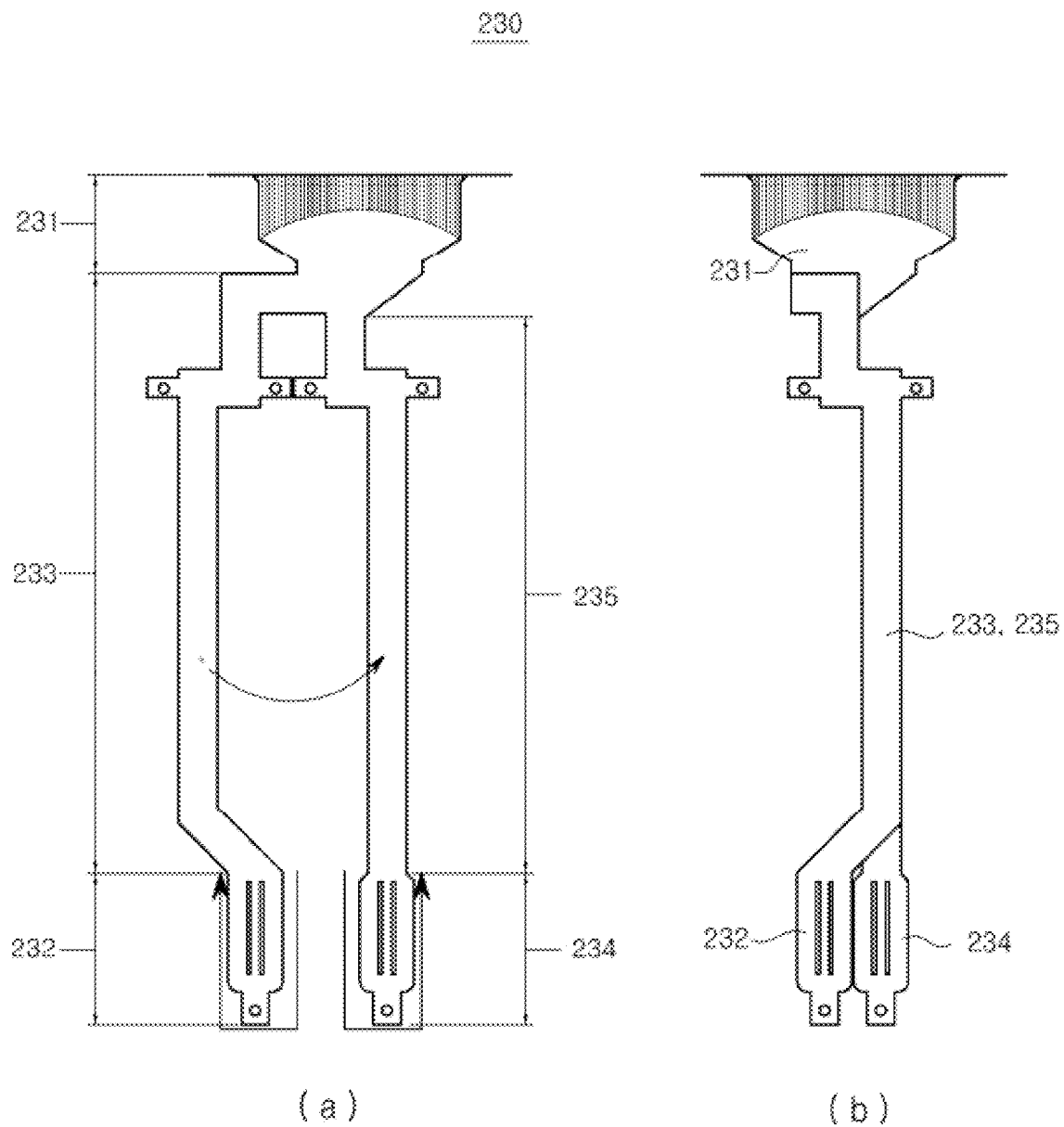
FIGS. 10A and 10B are views for explaining a structure of a flexible printed circuit board according to another embodiment.

FIGS. 10A and 10B are views for explaining a structure of a flexible printed circuit board according to another embodiment.

Although the disclosure has been described as an example in which the first connection part 233 is folded twice or more and overlapped with the second connection part 235 as illustrated in FIG. 6, the first connection part 233 may be folded only once and overlapped with the second connection part 235.

That is, in the flexible printed circuit board 230 having the structure illustrated in FIG. 10A, the first connection part 233 may be folded once and overlapped with the second connection part 235 in the form illustrated in FIG. 10B.

As is apparent from the above, according to the disclosure, an ultrasonic probe and a flexible printed circuit board (FPCB) can reduce a space occupied by a signal connector by folding and overlapping the flexible printed circuit board as the signal connector.

In addition, the ultrasonic probe and the flexible printed circuit board can better withstand a load caused by rotation of a transducer array by overlapping the flexible printed circuit board and winding the overlapped flexible printed circuit board around a rotation shaft.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:
1. An ultrasonic probe comprising:
a transducer array connected to a rotation shaft;
a motor provided to rotate the transducer array around the rotation shaft;
a printed circuit board provided to output a driving signal for driving the transducer array; and a flexible printed circuit board electrically connected to the printed circuit board to transmit the driving signal to the transducer array, wherein the flexible printed circuit board comprises:

an array terminal electrically connected to the transducer array;

a first terminal electrically connected to one portion of the printed circuit board;

a first connection part connecting the array terminal and the first terminal;

a second terminal electrically connected to the other portion of the printed circuit board; and a second connection part connecting the array terminal and the second terminal, and wherein the first connection part and the second connection part are overlapped with each other and wound around the rotation shaft.

2. The ultrasonic probe according to claim 1, wherein the first connection part is folded twice or more and overlapped with the second connection part.

3. The ultrasonic probe according to claim 2, wherein the first connection part is formed to be longer than the second connection part.

4. The ultrasonic probe according to claim 1, wherein the first connection part and the second connection part are completely overlapped with each other.

5. The ultrasonic probe according to claim 4, wherein a portion where the first connection part and the second connection part are overlapped with each other is wound around the rotation shaft.

6. The ultrasonic probe according to claim 1, wherein a radius at which the flexible printed circuit board is wound around the rotation shaft is smaller than a rotation radius of the transducer array.

7. The ultrasonic probe according to claim 1, wherein a length of the transducer array in a lateral direction is longer than a width of the overlapped first connection part and second connection part.

8. A flexible printed circuit board, which is configured to transmit a driving signal from a printed circuit board to a transducer array connected to a rotation shaft, comprising:

an array terminal electrically connected to the transducer array;

a first terminal electrically connected to one portion of the printed circuit board;

a first connection part connecting the array terminal and the first terminal;

a second terminal electrically connected to the other portion of the printed circuit board; and a second connection part connecting the array terminal and the second terminal, wherein the first connection part and the second connection part are overlapped with each other and wound around the rotation shaft.

9. The flexible printed circuit board according to claim 8, wherein the first connection part is folded twice or more and overlapped with the second connection part.

10. The flexible printed circuit board according to claim 9, wherein the first connection part is formed to be longer than the second connection part.

11. The flexible printed circuit board according to claim 8, wherein the first connection part and the second connection part are completely overlapped with each other.

12. The flexible printed circuit board according to claim 11, wherein a portion where the first connection part and the second connection part are overlapped with each other is wound around the rotation shaft.

13. The flexible printed circuit board according to claim 8, wherein a radius at which the flexible printed circuit board is wound around the rotation shaft is smaller than a rotation radius of the transducer array.

14. The flexible printed circuit board according to claim 8, wherein a length of the transducer array in a lateral direction is longer than a width of the overlapped first connection part and second connection part.

* * * * *